United States Patent [19]

Chou

[11] Patent Number: 5,834,568
[45] Date of Patent: Nov. 10, 1998

[54] FORMING CROSSLINKED POLYSUCCINIMIDE

[75] Inventor: Yueting Chou, Chesterfield, Mo.

[73] Assignee: Solutia, Inc., St. Louis, Mo.

[21] Appl. No.: 819,186

[22] Filed: Mar. 17, 1997

[51] Int. Cl.$^6$ .......................... C08F 283/04; C08G 69/48
[52] U.S. Cl. .................... 525/420; 525/432; 525/535; 525/540; 528/363; 528/378; 528/360; 528/345
[58] Field of Search ...................... 528/363, 378, 528/345, 360; 525/418, 419, 420, 535, 540

[56] References Cited

U.S. PATENT DOCUMENTS

| | | | |
|---|---|---|---|
| 4,332,928 | 6/1982 | Kluger et al. | 528/113 |
| 4,434,228 | 2/1984 | Swann | 435/108 |
| 4,556,689 | 12/1985 | Murakami et al. | 525/54.1 |
| 4,803,168 | 2/1989 | Jarvis, Jr. | 435/240.22 |
| 5,057,597 | 10/1991 | Koskan | 528/328 |
| 5,062,980 | 11/1991 | Migdal et al. | 252/51.5 |
| 5,142,062 | 8/1992 | Knebel et al. | 548/545 |
| 5,247,068 | 9/1993 | Donachy et al. | 530/350 |
| 5,284,936 | 2/1994 | Donachy et al. | 530/350 |
| 5,315,010 | 5/1994 | Koskan et al. | 548/520 |
| 5,319,145 | 6/1994 | Paik et al. | 528/328 |
| 5,461,085 | 10/1995 | Nagatomo et al. | 521/183 |
| 5,478,919 | 12/1995 | Koskan et al. | 528/363 |
| 5,484,945 | 1/1996 | Nagatomo et al. | 548/520 |
| 5,525,682 | 6/1996 | Nagatomo et al. | 525/40 |
| 5,525,703 | 6/1996 | Kalota | 528/363 |
| 5,552,516 | 9/1996 | Ross et al. | 528/363 |
| 5,552,517 | 9/1996 | Martin | 528/363 |
| 5,612,384 | 3/1997 | Ross et al. | 521/64 |
| 5,650,270 | 7/1997 | Giese et al. | 435/6 |

FOREIGN PATENT DOCUMENTS

| | | |
|---|---|---|
| 0387346 | 6/1995 | European Pat. Off. . |
| 0658586 | 6/1995 | European Pat. Off. . |
| 0683231 | 11/1995 | European Pat. Off. . |
| 0693557 | 1/1996 | European Pat. Off. . |
| 9300440 | 1/1993 | Japan . |
| 759545 | 5/1978 | U.S.S.R. . |

OTHER PUBLICATIONS

Bollettino Chimico Farmaceutico, Fondato da P. Viscardi nel 1861, Rivista di Scienze Farmaceutiche e Biologiche, 1993 vol. 132 Issue 2, 2 Febbraio 1993, "Forza Di Rigonfiamento E Proprieta Di Derivati Polisuccinimmidici" by G. Massimo [Massimo et al., Swelling Force and Properties of Polysuccinimide Derivatives, *Boll. Chim. Farm.* (1993), 123(2) pp. 43–44].

Journal of Controlled Release, 29 (1994) 63–72 "A New Water–Soluble Synthetic Polymer, α, β–Polyasparthydrazide, as Potential Plasma Expander and Drug Carrier", 1994 Elsevier Science B.V. by G. Giammona, et al.

Journal of Bioactive and Compatible Polymers, pp. 28–40, vol. 10—Jan. 1995 "Crosslinked α, β–Polyasparthydrazide Micromatrices for Controlled Release of Anticancer Drugs" by G. Giammona, et al.

Colloid & Polymer Science, 272:1637–1641 (1994) "Synthesis and Characterization of Water–Swellable α, β–Polyasparthydrazide Derivatives" by G. Giammona, et al.

Journal of Controlled Release, Official Journal of the Controlled Release Society, 1966 vol. 41 Issues 1 and 2, pp. 195–203, Accepted Dec. 8, 1995 "Crosslinked α, β–Polyasparthydrazide Hydrogels: Effect of Crosslinking Degree and Loading Method on Cytarabine Release Rate"0 by G. Giammona, et al.

Mat. Res. Soc. Symp. Proc., vol. 292, 1993 Materials Research Society, pp. 277–283, "Large Scale Thermally Synthesized Polyaspartate as a Biodegradable Substitute in Polymer Applications" by A.P. Wheeler and L.P. Koskan.

Journal of Polymer Science, Polymer Letters Edition, Dec. 1982, vol. 20, No. 12, pp. 621–627, "Addition Polyimides. II. Polyaspartimide Oligomers" by John Wiley & Sons, Inc., by I.K. Varma, et al.

Bollettino Chimico Farmaceutico, Fondato da P. Viscardi nel 1861, Rivista di Scienze Farmaceutiche e Biologiche, 1993 vol. 132 Issue 2, 2 Febbraio 1993, "Forza Di Rigonfiamento E Proprieta Di Derivati Polisuccinimmidici" by G. Massimo [Massimo et al., Swelling Force and Properties of Polysuccinimide Derivatives, *Boll. Chim. Farm.* (1993), 123(2) pp. 43–44].

*Primary Examiner*—Zinna Northington Davis
*Attorney, Agent, or Firm*—Fitzpatrick, Cella, Harper & Scinto

[57] ABSTRACT

A process for crosslinking polysuccinimide (PSI) by reacting dry PSI with an N-containing crosslinker.

5 Claims, No Drawings

FORMING CROSSLINKED POLYSUCCINIMIDE

BACKGROUND OF THE INVENTION

This invention relates to preparing crosslinked polysuccinimide (PSI) and more particularly to process improvements in forming such PSI.

PSI (sometimes called anhyrdopolyaspartic acid or polyanhydroaspartic acid) is prepared by thermal polycondensation of L-aspartic acid. The preformed polymer is then typically base-hydrolyzed to form polyaspartate salt which has industrially important uses such as for scale and corrosion inhibition and as a lubricant in metal working fluids.

Crosslinking unhydrolyzed PSI followed by base hydrolysis renders the resulting salt superabsorbent in that it can absorb many times its own weight of liquid such as water. This creates another important class of applications such as thickeners, flocculants, absorbers and the like. This is disclosed in U.S. Pat. No. 5,525,703 to Kalota wherein the crosslinker is a specific polyamine. In that patent and U.S. Pat. No. 5,525,682 to Nagatomo et al, crosslinking is done in solution in an organic solvent such as dimethyl formamide or while suspended in water. To isolate the crosslinked polymer, the water must be removed or the polymer precipitated from solution and the solvent removed.

SUMMARY OF THE INVENTION

Now improvements have been made in crosslinking PSI which reduce complexity and increase cost effectiveness of the process.

Accordingly, a principal object of this invention is to provide a simplified process for crosslinking PSI which avoids isolating and drying the crosslinked product.

Other objects will in part be obvious and will in part appear from the following description and claims.

These and other objects are accomplished by providing a process for crosslinking PSI by reacting dry PSI with crosslinker of formula I.

$$X-R-(Y)n \quad \text{I.}$$

wherein X and Y are, independently of each other, selected from $NH_2$, $NHR^1$, $NHNH_2$, $C(=O)NHNH_2$ and $C(=NH)NH_2$; n is an integer from 1 to 9; and R can be absent or selected from i) linear, branched or cyclic unsubstituted or substituted alkyl, alkenyl or arylalkyl groups having 1 to 30 carbon atoms optionally containing one or more hetero atoms selected from O, N and S and ii) aromatic groups having 6 to 26 carbon atoms optionally substituted with an OH or $OR^1$ group wherein $R^1$ is linear or branched alkyl or alkenyl having 1 to 10 carbon atoms.

Optional substituents of R of i) above are common organic functional groups not interfering with the crosslinking reaction such as one or more of the following: carboxyl, hydroxyl, ether, amide, tertiary amine, chloride and ketone.

A preferred crosslinker is 4-aminomethyl-1,8-diaminooctane, sometimes referred to as triaminononame, abbreviated TAN.

DETAILED DESCRIPTION OF THE INVENTION

Polysuccinimide to be crosslinked according to the invention has a molecular weight (weight average) of at least about 20,000, the higher the molecular weight the greater the liquid absorbing capacity of the crosslinked polyaspartate polymer salt. Such preformed polymers are prepared by known means as described in U.S. Pat. Nos. 5,057,597; 5,315,010; 5,319,145 and 5,142,062 the PSI-forming disclosures of which are incorporated herein by reference. In systems of these patents reactors of various types are used to convert L-aspartic acid to PSI by thermal condensation. Catalysts such as phosphoric acid are optionally used to increase molecular weight and reduce reaction time. When using acid catalyst it is preferably removed before crosslinking to avoid reaction with the N-containing crosslinker. In accordance with this invention, dry PSI from the thermal condensation reaction is used directly without dissolution in organic solvent or suspension in water in the reaction with crosslinker. A preferred procedure providing high molecular weight PSI carries out polycondensation at reduced pressure and 180° C. in the presence of phosphoric acid as described in U.S. Pat. No. 5,142,062 (Kuebel et al), the disclosure of which is incorporated herein by reference.

The crosslinker (including mixtures) is of structural formula I. defined above. Examples satisfying formula I. include hexamethylene diamine, 4-aminomethyl-1,8 diaminooctane, hydrazine, trizane, tetrazane, lysine, guanidine, oxalic dihydrazide, 1,2,3-tris(-3 aminopropoxy) propane where $R=C_{14}$, O is hetero atom, $X=NH_2$, $Y=NH_2$ and n=2, arylalkyl aminohydrazine of the formula $NH_2NHCH_2CH_2$

$CH_2CH_2CH_2NH_2$ where $R=C_{11}$, $X=NHNH_2$, $Y=NH_2$ and n=1, 4-amino benzamidine where $R=C_6$, $X=NH_2$, $Y=C(=NH)NH_2$ and n=1. The N-containing crosslinker satisfying formula I is preferably in anhydrous (neat), undiluted, virgin form as a solid or liquid during crosslinking but alternatively can be a component of a dilute or concentrated solution, dispersion or suspension.

Crosslinking occurs at room or, to reduce reaction time, elevated temperature. The crosslinker may be solid at room temperature and melt to a liquid at higher crosslinking temperature. Generally, adequate crosslinking occurs up to or about 100° C. After crosslinking the crosslinked product is preferably not separately isolated but rather is directly subjected to base hydrolysis to open succinimide rings not reacted with the crosslinker.

Crosslinked polymers are prepared having a wide range of properties depending on the degree of crosslinking achieved which is largely controlled by the mole ratio of succinimide units to crosslinker. For commercial superabsorbing applications, this ratio is typically from about 50 to about 5.

Compounds as crosslinked polyaspartate salt prepared using the crosslinking process of this invention are useful in many applications including diapers, adult incontinence pads, cable wrapping, medical absorbent pads and soil moisture enhancement.

The invention is further described in the following Examples which are not intended to limit or restrict the invention. Unless otherwise indicated all quantities are expressed in weight.

The tea bag test referred to in the Examples to measure superabsorbence is conducted as follows: 0.2 g of a sample is placed in a tea bag-like pouch (2"×2") of nonwoven fabric and heat sealed. The tea bag is subjected to a 15 second immersion in a 0.9% saline solution, one minute drip dry and weighing, followed by a 2 min. 45 sec. immersion, one min.

drip dry and weighing, and then an additional 7 min. immersion, one min. drip dry and weighing. The absorbencies for 15 seconds, 3 minutes and 10 minutes are calculated according to the following equation and the 10 min. result reported as superabsorbing performance. Absorbency in g/g=(weight of the tea bag with treated sample minus weight of a wet empty tea bag)/0.2. g.

EXAMPLE 1

Into a 250 cc three-necked flask equipped with mechanical stirrer, thermometer, addition funnel, and heating mantle is charged 16.22 gm (0.1672 mole) of dry polysuccinimide with a molecular weight of 34000 Daltons (obtained by gel permeation chromatography). Then 2.43 gm (0.0140 mole) of liquid triaminononane is added dropwise at room (23° C.) temperature to the stirred dry PSI. After addition the reaction mixture is heated to and held at 50° C. for one hour to produce crosslinked PSI.

Two grams (ca. 0.0206 mole) of this crosslinked PSI is taken for hydrolysis, stirred in 250 cc water and gradually heated to 45° C. About 7.3 cc 10% (0.0183 mole) caustic solution is added and pH controlled between 10.8–11.0. Final pH after caustic addition is about 11 and the mixture appears as a thick cloudy suspension of small particles. It is stirred overnight and filtered through a fritted disc funnel under suction. A wet solid left on the funnel is washed with methanol several times and dried in a vacuum oven producing 1.68 gm of superabsorbent crosslinked polyaspartate salt product which absorbs 14 gm saline solution per gm of product in the tea bag test.

Commonly owned copending application Ser. No. 08/804,859, filed Feb. 24, 1997, by Yueting Chou for "Process For Preparing Superabsorbing Crosslinked Polyaspartate Salt" (Atty. Docket No. 43-21-11454) discloses conducting the just-noted hydrolysis reaction of crosslinked PSI using neat or concentrated base to eliminate or minimize water removal in forming solid, crosslinked, polyaspartate (PA) salt. Instead of using significant water as noted above in this Example, the teaching of that application may be used with this invention and if neat base is used, solid, crosslinked PA salt is formed without any water.

EXAMPLE 2

A) The procedure of Example 1 is repeated using hexamethylene diamine (HMDA) as crosslinker which is solid at room temperature, liquid at 50° C. and melts at 42°–45° C. 3 g (0.0309 mole) of solid PSI with Mw of 56,000 and 0.36 g (0.0031 mole) of HMDA are charged to a heated, stirred flask and held at 55° C. for 2 hours. About 20 ml water is added and then 9.9 ml 10% caustic added at 50° C. Final pH is about 12 and then the mixture is heated to and held at 70° C. for 2 hours. Water is evaporated and the residue further dried at 60° C. to yield 4.26 g dry product which gives 7 g SAP saline solution absorption in the tea bag test.

B) The procedure of the preceding paragraph is repeated except the temperature is raised only to 38° C. at which the diamine is still solid. The crosslinking reaction therefore is a solid/solid reaction which is allowed to proceed at 38° C. for 4 hours. Saline absorption in the tea bag test is the same as A at 7 g/g.

EXAMPLE 3

The crosslinker is lysine which at room temperature is a solid amino acid melting at 212° C. It is added and reacted as solid with dry PSI at 180° C. 3 g (0.0309 mole) of solid PSI with Mw of 56,000 and 1.04 g (0.0031 mole) of lysine are charged to a flask which is stirred and gradually heated to and held at 180° C. for 5 hours. About 20 ml water is added and then 7.4 ml 10% caustic added at 50° C. Final pH is about 10 and then the mixture is stirred overnight at room temperature. Water is evaporated and the residue further dried under vacuum at 60° C. to yield 4.6 g dry product which gives 6 g/g SAP saline solution absorption in the tea bag test.

CONTROL EXAMPLE C1

Into a 500 cc three-necked flask equipped with mechanical stirrer, thermometer, addition funnel, and heating mantle are charged 10.03 gm (0.1034 mole) of PSI with a molecular weight of 34000, along with 200 cc dimethyl formamide (DMF). This is heated to 30° C. with agitation to ensure total dissolution. A solution of 1.36 gm (0.0079 mole) TAN in 46.5 cc DMF is added and the mixture held at room temperature for two hours. During hold time the mixture thickens to a gel and 100 cc more DMF is added. The DMF is stripped away under vacuum and about 11.7 gm of crosslinked PSI is collected.

This prior art technique is in contrast to Example 1 where dissolution of neither the PSI nor the crosslinker is required.

2.5 gm (ca. 0.0258 mole) of the crosslinked PSI is subjected to aqueous suspension hydrolysis. The crosslinked PSI is placed in a beaker with 500 cc water and the mixture stirred at 40° C. About 9.3 cc 10% (0.0232 mole) NaOH solution is charged and the pH controlled at 10.8–11.0. After caustic addition the mixture is stirred for 30 minutes at room temperature and then filtered through a fritted disc funnel (25–40 micron) forming a light gel on the funnel. The light gel is discharged into methanol and the solid precipitated out, separated by filtration and dried to obtain 2.05 gm crosslinked PA salt product which shows 14 gm/gm saline solution absorption in the tea bag test.

Absorption in Example 1 using the simplified process of the invention and methanol to precipitate the polymer is equal to the prior art system of C1. Weight yield (value not given) using alcohol precipitation, however, is reduced because some polymer with lower absorbency is not isolate and not present in the tea bag test. Methanol is not used in Examples 2 and 3, only evaporation, so weight yield is quantitative but absorbency reduced from Examples 1 and C1 since low absorbency polymer is present in the tea bag test.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

We claim:

1. A process for crosslinking polysuccinimide which comprises reacting dry polysuccinimide with crosslinker of the formula I

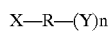

wherein X and Y are, independently of each other, selected from $NH_2$, NH, $NHNH_2$ $C(=O)NHNH_2$ and $C(=NH)NH_2$; n is an integer from 1 to 9; and R can be absent or selected from i) linear, branched or cyclic unsubstituted or substituted alkyl, alkenyl or arylalkyl groups having 1 to 30 carbon atoms optionally containing one or more hetero atoms selected from O, N and S and ii) aromatic groups containing 6 to 26 carbon atoms optionally substituted with an OH or $OR^1$ group wherein $R^1$ is linear or branched alkyl or alkenyl having 1 to 10 carbon atoms.

2. A process of claim 1 wherein the crosslinker is 4-aminomethyl-1,8-diaminooctane.

3. A process of claim 1 wherein the crosslinker is in virgin, undiluted form.

4. A process of claim 1 wherein the crosslinker is hexamethylene diamine.

5. A process of claim 1 wherein the crosslinker is lysine.

* * * * *